(12) United States Patent
Zhang et al.

(10) Patent No.: US 11,727,243 B2
(45) Date of Patent: Aug. 15, 2023

(54) KNOWLEDGE-GRAPH-EMBEDDING-BASED QUESTION ANSWERING

(71) Applicant: Baidu USA, LLC, Sunnyvale, CA (US)

(72) Inventors: Jingyuan Zhang, San Jose, CA (US); Dingcheng Li, Sammamish, WA (US); Ping Li, Bellevue, WA (US); Xiao Huang, College Station, TX (US)

(73) Assignee: Baidu USA LLC, Sunnyvale, CA (US)

( * ) Notice: Subject to any disclaimer, the term of this patent is extended or adjusted under 35 U.S.C. 154(b) by 1012 days.

(21) Appl. No.: 16/262,618

(22) Filed: Jan. 30, 2019

(65) Prior Publication Data
US 2020/0242444 A1    Jul. 30, 2020

(51) Int. Cl.
| G06N 3/00 | (2023.01) |
| G06F 16/901 | (2019.01) |
| G06N 3/08 | (2023.01) |
| G06F 16/2452 | (2019.01) |
| G06N 3/04 | (2023.01) |
| G06N 3/006 | (2023.01) |
| G06N 3/042 | (2023.01) |
| G06N 3/044 | (2023.01) |

(52) U.S. Cl.
CPC ....... *G06N 3/006* (2013.01); *G06F 16/24522* (2019.01); *G06F 16/9024* (2019.01); *G06N 3/042* (2023.01); *G06N 3/044* (2023.01); *G06N 3/08* (2013.01)

(58) Field of Classification Search
CPC ............. G06F 16/2452; G06F 16/3329; G06F 16/367; G06F 16/9024; G06N 3/006; G06N 3/0427; G06N 3/0445; G06N 3/08; G06N 5/02
See application file for complete search history.

(56) References Cited

FOREIGN PATENT DOCUMENTS

| CN | 106934012 A | 7/2017 |
| CN | 107748757 A | 3/2018 |
| CN | 107798126 A | 3/2018 |

OTHER PUBLICATIONS

Komninos ("Leveraging Structure for Learning Representations of Words, Sentences and Knowledge Bases", PhD Thesis, University of York, Jan. 2018, pp. IEEE Pervasive Computing, 2018, pp. 1-130) (Year: 2018).*

(Continued)

*Primary Examiner* — Miranda M Huang
*Assistant Examiner* — Robert Lewis Kulp
(74) *Attorney, Agent, or Firm* — North Weber & Baugh LLP

(57) ABSTRACT

Described herein are embodiments for question answering over knowledge graph using a Knowledge Embedding based Question Answering (KEQA) framework. Instead of inferring an input questions' head entity and predicate directly, KEQA embodiments target jointly recovering the question's head entity, predicate, and tail entity representations in the KG embedding spaces. In embodiments, a joint distance metric incorporating various loss terms is used to measure distances of a predicated fact to all candidate facts. In embodiments, the fact with the minimum distance is returned as the answer. Embodiments of a joint training strategy are also disclosed for better performance. Performance evaluation on various datasets demonstrates the effectiveness of the disclosed systems and methods using the KEQA framework.

20 Claims, 8 Drawing Sheets

(56) References Cited

OTHER PUBLICATIONS

Bordes et al. ("Large-scale Simple Question Answering with Memory Networks", http://arxiv.org/pdf/1506.02075v1.pdf, arXiv: 1506.02075v1 [cs.LG], Jun. 5, 2015, pp. 1-10) (Year: 2015).*
Miwa et al. ("End-to-End Relation Extraction using LSTMs on Sequences and Tree Structures", http://arxiv.org/pdf/1601.00770v3.pdf, arXiv:1601.00770 v3[cs.CL], Jun. 8, 2016, pp. 1-13) (Year: 2016).*
Dai et al. ("CFO: Conditional Focused Neural Question Answering with Large-scale Knowledge Bases", http://arxiv.org/pdf/1606.01994v2.pdf, arXiv:1606.01994v2[cs.CL], Jul. 4, 2016, pp. 1-11) (Year: 2016).*
Zheng et al. ("Joint Extraction of Entities and Relations Based on a Novel Tagging Scheme", http://arxiv.org/pdf/1706.05075v1.pdf, arXiv:1706.05075v1[cs.CL], Jun. 7, 2017, pp. 1-10) (Year: 2017).*
Lukovnikov et al. ("Neural Network-based Question Answering over Knowledge Graphs on Word and Character Level", IW3C2 WWW2017, Apr. 2017, pp. 1211-1220) (Year: 2017).*
Zhang et al. ("Knowledge Graph Embedding for Hyper-Relational Data", Tsinghua Science and Technology, vol. 22, No. 2, Apr. 2017, pp. 185-197) (Year: 2017).*
Wang et al. ("Knowledge Graph Embedding by Translating on Hyperplanes", Proceedings of the Twenty-Eighth AAAI Conference on Artificial Intelligence, 2014, pp. 1112-1119) (Year: 2014).*
Qiu et al. ("Joint Detection of Topic Entity and Relation for Simple Question Answering", Knowledge Science, Engineering and Management, 11th International Conference, Aug. 2018, Part II, pp. 371-382) (Year: 2018).*
Han et al. ("A Triple-Branch Neural Network for Knowledge Graph Embedding", IEEE Access 6, 2018, pp. 76606-76615) (Year: 2018).*
Hao et al.,"An End-to-End Model for Question Answering over Knowledge Base with Cross-Attention Combining Global Knowledge," In ACL. 221-231, 2017. (11 pgs).
Lehmann et al.,"DBpedia—A Large-Scale, Multilingual Knowledge Base Extracted From Wikipedia," Semantic Web 6, 2 (2015), 167-195, 2015. (29pgs).
Li et al.,"Representation Learning for Question Classification via Topic Sparse Autoencoder and Entity Embedding," In IEEE Big Data, 2018. (8 pgs).
Lin et al.,"Modeling Relation Paths for Representation Learning of Knowledge Bases," arXiv preprint arXiv:1506.00379, 2015. (10pgs).
Lin et al.,"Learning Entity and Relation Embeddings for Knowledge Graph Completion," In AAAI, 2181-2187, 2015. (3 pgs).
Long et al.,"Leveraging Lexical Resources for Learning Entity Embeddings in Multi-Relational Data," arXiv preprint arXiv:1605.05416, 2016. (6pgs).
Lukovnikov et al.,"Neural Network-Based Question Answering over Knowledge Graphs on Word and Character Level," In WWW, 1211-1220, 2017. (10pgs).
Mikolov et al.,"Distributed Representations of Words and Phrases and Their Compositionality," arXiv preprint arXiv:1310.4546, 2013. (9pgs).
Mohammed et al.,"Strong Baselines for SimpleQuestion Answering over Knowledge Graphs with and without Neural Networks,"arXiv preprint arXiv:1712.01969, 2018. (6pgs).
Pappu et al.,"Lightweight Multilingual Entity Extraction and Linking," In WSDM. 365-374, 2017. (10 pgs).
Pennington et al.,"GloVe:Global Vectors for Word Representation," In EMNLP,1532-1543, 2014. (12 pgs).
Socher et al.,"Reasoning with Neural Tensor Networks for Knowledge Base Completion," In NIPS. 926-934, 2013. (10 pgs).
Suchanek et al.,"YAGO: A Core of Semantic Knowledge Unifying WordNet and Wikipedia," In WWW. 697-706, 2007. (10pgs).
Tay et al.,"Random Semantic Tensor Ensemble for Scalable Knowledge Graph Link Prediction," In WSDM, 751-760, 2017. (11 pgs).
Ture et al.,"No Need toPay Attention:Simple Recurrent Neural Networks Work!(for Answering "Simple" Questions)," arXiv preprint arXiv:1606.05029, 2017. (7pgs).

Wang et al.,"Knowledge Graph Embedding: A Survey of Approaches and Applications," TKDE 29, 12, 2724-2743, 2017. (2pgs).
Wang et al.,"Text-Enhanced Representation Learning for Knowledge Graph," In IJCAI, 1293-1299, 2016. (7pgs).
Wang et al.,"Knowledge Graph and Text Jointly Embedding," In EMNLP, 1591-1601, 2014. (11pgs).
Wang et al.,"Knowledge Graph Embedding by Translating on Hyperplanes," In AAAI, 2014. (8pgs).
Weston et al.,"Connecting Language and Knowledge Bases with Embedding Models for Relation Extraction," In EMNLP, 1366-1371, 2013. (6 pgs).
Xiao et al.,"SSP: Semantic Space Projection for Knowledge Graph Embedding with Text Descriptions," In AAAI, 3104-3110, 2017. (7pgs).
Xie et al.,"Representation Learning of Knowledge Graphs with Entity Descriptions," In AAAI, 2659-2665, 2016. (7 pgs).
Yang et al.,"Joint Relational Embeddings for Knowledge-Based Question Answering," In EMNLP, 645-650, 2014. (6pgs).
Yang et al.,"Knowledge-Based Question Answering Using the Semantic Embedding Space," Expert Systems with Applications 42, 23, 9086-9104, 2015. (2 pgs).
Wen-tau Yih et al.,"Semantic Parsing via Staged Query Graph Generation: Question Answering with Knowledge Base," In ACL-IJCNLP, 2015. (11 pgs).
Yin et al.,"Simple Question Answering by Attentive Convolutional Neural Network," In COLING, 1746-1756, 2016. (11pgs).
Yu et al.,"Improved Neural Relation Detection for Knowledge Base Question Answering," In ACL, 571-581, 2017. (11 pgs).
Zhang et al.,"Joint Semantic Relevance Learning with Text Data and Graph Knowledge,"In Workshop on Continuous Vector Space Models and their Compositionality,32-40, 2015.(32p).
Zhang et al.,"Collaborative Knowledge Base Embedding for Recommender Systems," In KDD, 353-362, 2016. (10 pgs).
Zhong et al.,"Aligning Knowledge and Text Embeddings by Entity Descriptions," In EMNLP, 267-272, 2015. (6pgs).
Bahdanau et al,"Neural Machine Translation by Jointly Learning to Align and Translate," arXiv preprint arXiv:1409.0473, 2016. (15pgs).
Bao et al.,"Constraint-Based Question Answering with Knowledge Graph," In Proceedings of COLING, 2503-2514. 2016. (12 pgs).
Berant et al.,"Semantic Parsing on Freebase from Question-Answer Pairs," n Proceedings of EMNLP,1533-1544, 2013. (12 pgs).
Blanco et al."Fast and Space-Efficient Entity Linking for Queries," In WSDM, 179-188, 2015. (10pgs).
Bordes et al.,"Question Answering with Subgraph Embeddings," arXiv preprint arXiv:1406.3676, 2014. (10 pgs).
Bordes et al.,"Large-Scale Simple Question Answering with Memory Networks," arXiv preprint arXiv:1506.02075, 2015. (10pgs).
Bordes et al.,"Translating Embeddings for Modeling Multi-relational Data," In NIPS, 2787-2795, 2013. (9pgs).
Bordes et al.,"Learning Structured Embeddings of Knowledge Bases," In AAAI, 2011. (6pgs).
Bordes et al.,"Open Question Answering with Weakly Supervised Embedding Models," arXiv preprint arXiv:1404.432, 2014. (16pgs).
Dai et al.,"CFO: Conditional Focused Neural Question Answering with Large-Scale Knowledge Bases," arXiv preprint arXiv:1606.01994, 2016.(11pgs).
Das et al.,"Question Answering on Knowledge Bases and Text using Universal Schema and Memory Networks," arXiv preprint arXiv:1704.08384, 2017. (8pgs).
Dong et al.,"Question Answering Over Freebase With Multi-Column Convolutional Neural Networks," In ACL-IJCNLP, 260-269, 2015. (10pgs).
Fader et al.,"Paraphrase-Driven Learning for Open Question Answering," In ACL, 1608-1618, 2013. (11pgs).
Fan et al.,"Jointly Embedding Relations and Mentions for Knowledge Population," In RANLP. 186-191, 2015. (6pgs).
Fan et al.,"Multi-Task Neural Learning Architecture for End-to-End Identification of Helpful Reviews," In ASONAM. 343-350, 2018. (2pgs).
Fan et al.,"A Globalization-Semantic Matching Neural Network for Paraphrase Identification," In CIKM. 2067-2075, 2018. (2pgs).

(56) References Cited

OTHER PUBLICATIONS

Fan et al.,"Distributed Representation Learning for Knowledge Graphs with Entity Descriptions," Pattern Recognition Letters 93, 31-37, 2017. (4pgs).

Golub et al.,"Character-Level Question Answering with Attention," In EMNLP,1598-1607, 2016. (10pgs).

Google, "Freebase Data Dumps," 2018, [online], [Retrieved Jul. 20, 2020]. Retrieved from Internet <URL:https://developers.google.com/freebase> (2pgs).

Hakkani-Tür et al.,"Probabilistic Enrichment of Knowledge Graph Entities for Relation Detection in Conversational Understanding," In INTERSPEECH, 2014. (5 pgs).

Chinese Office Action dated Apr. 3, 2023, in Chinese Application No. 201911148232.0 (10 pgs).

\* cited by examiner

KNOWLEDGE-GRAPH-EMBEDDING-BASED QUESTION ANSWERING

BACKGROUND

A. Technical Field

The present disclosure relates generally to systems and methods for question answering. More particularly, the present disclosure relates to systems and methods for question answering over knowledge graph.

B. Background

Question answering over knowledge graph (QA-KG) aims to use facts in a knowledge graph (KG) to answer natural language questions. It helps end users more efficiently and more easily access the substantial and valuable knowledge in the KG, without knowing its data structures. QA-KG is a nontrivial problem since capturing the semantic meaning of natural language is difficult for a machine. Many knowledge graph embedding methods have been proposed. One key idea is to represent each predicate/entity as a low-dimensional vector, such that the relation information in the KG could be preserved. However, this remains a challenging task since a predicate could be expressed in different ways in natural language questions. Furthermore, the ambiguity of entity names and partial names makes the number of possible answers large.

Accordingly, what is needed are systems and methods that can be used to make question answering over knowledge graph more effective and more robust.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. ("FIG.") 1 graphically depicts a knowledge embedding based question answering (KEQA) framework, according to embodiments of the present disclosure.

DETAILED DESCRIPTION OF EMBODIMENTS

Figure 1:
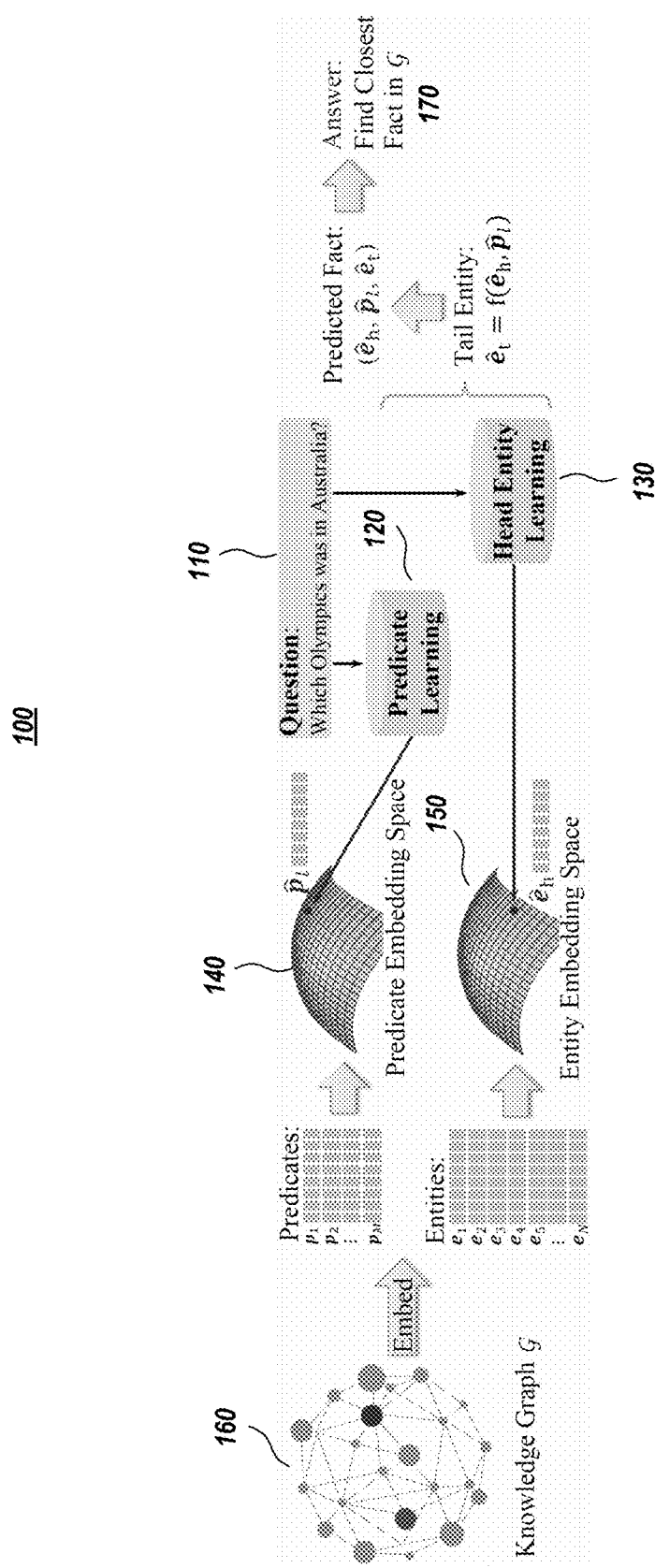

In the following description, for purposes of explanation, specific details are set forth in order to provide an understanding of the present disclosure. It will be apparent, however, to one skilled in the art that embodiments may be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the present disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. An image may be a still image or from a video.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

With the rise of large-scale knowledge graphs such as Wikidata, Freebase, Dbpedia, and YAGO, question answering (QA) over knowledge graph has become a crucial topic and attracts massive attention. A knowledge graph (KG) typically is a directed graph with real-world entities as nodes and their relations as edges. In this graph, each directed edge, along with its head entity and tail entity, constitute a triple, i.e., (head entity, predicate, tail entity), which is also named as a fact. Real-world knowledge graphs may contain millions or billions of facts. Their large volume and complex data structures make it difficult for regular users to access the substantial and valuable knowledge in them. To bridge the gap, Question Answering over Knowledge Graph (QA-KG) is proposed. It targets trying to automatically translate the end users' natural language questions into structured queries such as SPARQL, and returning entities and/or predicates in the KG as answers. For example, given the question "Which Olympics was in Australia?", QA-KG aims to identify its corresponding two facts, i.e., (Australia, olympics_participated_in, 1952/2004 Summer Olympics).

Question answering over knowledge graph provides a way for artificial intelligence systems to incorporate knowledge graphs as a key ingredient to answer human questions, with applications ranging from search engine design to conversational agent building. However, the QA-KG problem is far from solved since it involves multiple challenging subproblems such as semantic analysis and entity linking.

The effectiveness of knowledge graph embedding in different real-world applications motivates exploring its potential usage in solving the QA-KG problem in this patent document. Knowledge graph embedding targets learning a low-dimensional vector representation for each predicate/entity in a KG, such that the original relations are well preserved in the vectors. These learned vector representations may be employed to complete a variety of downstream applications efficiently. Examples include KG completion, recommender systems, and relation extraction. In this patent document, embodiments of the knowledge graph embedding are presented to perform QA-KG. The KG embedding representations may advance the QA-KG in several ways. They not only are within a low-dimensional space, but also could promote the downstream applications to take the entire KG into consideration, because even a single predicate/entity representation is a result of interactions with the whole KG. In addition, similar predicates/entities tend to have similar vectors. This property may be used to help the downstream algorithms handle predicates or entities that are not in the training data.

However, it remains a nontrivial task to conduct QA-KG based on the knowledge graph embedding. There are three major challenges. First, a predicate often has various expressions in natural language questions. These expressions could be quite different from the predicate names. For instance, the predicate person.nationality can be expressed as "what is . . . 's nationality", "which country is . . . from", "where is . . . from", etc. Second, even assuming that the entity names could be accurately identified, the ambiguity of entity names and partial names would still make it difficult to find the correct entity, since the number of candidates is often large. As the size of KG keeps increasing, many entities would share the same names. Also, end users could use partial names in their utterances. For example, in the question "How old is Obama?", only part of the entity name Barack Obama is indicated. Third, the domains of end users' questions are often unbounded, and any KG is far from complete. New questions might involve predicates that are different from the ones in the training. This makes demands on the robustness of the QA-KG algorithms.

To bridge the gap, this patent document discloses how to take advantage of the knowledge graph embedding to perform question answering. In the present disclosure, a focus is on the most common type of questions in QA-KG, i.e., simple questions. A simple question is a natural language question that only involves a single head entity and a single predicate. Through analyzing the problem, three research questions are answered: (i) How to apply the predicate embedding representations to bridge the gap between the natural language expressions and the KG's predicates?; (ii) How to leverage the entity embedding representations to tackle the ambiguity challenge?; and (iii) How to take advantage of the global relations preserved in the KG embedding representations to advance the QA-KG framework? Following these questions, the present document discloses embodiments of a framework named Knowledge Embedding based Question Answering (KEQA). In summary, some key contributions of the present document are as follows:

Formally define the knowledge graph embedding based question answering problem.

Disclosure of embodiments of an effective framework KEQA that answer a natural language question by jointly recovering its head entity, predicate, and tail entity representations in the knowledge graph embedding spaces.

Design a joint distance metric that takes the structures and relations preserved in the knowledge graph embedding representations into consideration.

Empirically demonstrate the effectiveness and robustness of KEQA embodiments on a large benchmark, i.e., SimpleQuestions.

B. Some Related Work

Some related works in various aspects are summarized in this Section.

Embedding-based question answering over KG attracts lots of attention recently. It is related to, but different from, the presented KG embedding based question answering problem. The former relies on low-dimensional representations that are learned during the training of the QA-KG methods. The latter performs KG embedding to learn the low-dimensional representations first, and then conducts the QA-KG task. Yih et al. (Semantic Parsing via Staged Query Graph Generation: Question Answering with Knowledge Base. In ACL-IJCNLP) and Bao et al. (Constraint-Based Question Answering with Knowledge Graph. In COLING. 2503-2514) reformulated the question answering problem as the generation of particular subgraphs. A series of work proposed to project questions and candidate answers (or entire facts) into a unified low-dimensional space based on the training questions, and measure their matching scores by the similarities between their low-dimensional representations. Some achieved this projection by learning low-dimensional representations for all words, predicates, and entities, based on the training questions and paraphrases of questions. Some achieved this projection by using the logical properties of questions and potential facts, such as semantic embedding and entity types. Several deep learning based models achieved this projection by feeding words in questions into convolutional neural networks, LSTM networks, or gated recurrent units neural networks. Das et al. (Question Answering on Knowledge Bases and Text using Universal Schema and Memory Networks. In ACL, 2017) achieved this projection by using matrix factorization to incorporate the corpus into the KG, and LSTM to embed a question.

Most of these models rely on the margin-based ranking objective functions to learn the model weights. Several works explored leveraging the character-level neural networks to advance the performance. Most recently, Mohammed et al. (Strong Baselines for Simple Question Answering over Knowledge Graphs with and without Neural Networks, NAACL-HLT. 291-296) and Ture et al. (No Need to Pay Attention: Simple Recurrent Neural Networks Work, EMNLP. 2866-2872) considered each predicate as a label category, and performed predicate linking via deep classification models.

Knowledge graph embedding targets at representing the high-dimensional KG as latent predicate and entity representations P and E. Bordes et al. (Learning Structured Embeddings of Knowledge Bases. 2011 AAAI) achieved this goal by constructing two transform matrices $M_{head}$ and $M_{tail}$ for each type of predicate $\ell$, and minimizing the distance between projections $M_{head}e_h$ and $M_{tail}e_t$ for all facts $(h,\ell,t)$ with $\ell$ as predicate. Bordes et al. (Translating Embeddings for Modeling Multi-relational Data. 2013 NIPS. 2787-2795) designed a translation-based model TransE. It trains two matrices P and E, aiming to minimize the overall distance $\Sigma \|e_h + \mathbf{P}_\ell - e_t\|_2^2$ for all facts $(h,\ell,t)$. Motivated by TransE, a series of translation-based models have been explored. Wang et al. (Knowledge Graph Embedding by Translating on Hyperplanes. 2014 AAAI) proposed TransH to handle one-to-many or many-to-one relations. Instead of measuring the distance between $e_h$ and $e_t$ directly, TransH projects them into a predicate-specific hyperplane. Lin et al. (Learning Entity and Relation Embeddings for Knowledge Graph Completion. 2015 AAAI 2181-2187) proposed TransR, which defines a transform matrix $\mathbf{M}_\ell$ for each predicate $\ell$ and targets at minimizing $\Sigma \|e_h \mathbf{M}_\ell + \mathbf{P}_\ell - e_t \mathbf{M}_\ell\|_2^2$. Lin et al. (Modeling Relation Paths for Representation Learning of Knowledge Bases, 2015 EMNLP. 705-814) proposed PTransE, which advances TransE via taking multi-hop relations into consideration.

Efforts have also been devoted to incorporating the semantic information in a corpus into KG embedding. Some demonstrated that using pre-trained word embedding to initialize KG embedding methods would enhance the performance. Several work explored trying to advance TransE, either via taking relation mentions in corpus into consideration, or via projecting predicate/entity representations into a semantic hyperplane learned from the topic model. Attempts have also been made to apply TransE and word2vec to model a KG and a corpus respectively, and then fuse them based on anchors in Wikipedia, entity descriptions, or contextual words of predicates/entities learned from the corpus. Zhang et al. (Joint Semantic Relevance Learning with Text Data and Graph Knowledge. In Workshop on Continuous Vector Space Models and their Compositionality. 32-40) jointly embedded the KG and corpus via negative sampling (Distributed Representations of Words and Phrases and Their Compositionality, 2013 NIPS. 3111-3119). Xie et al. (Representation Learning of Knowledge Graphs with Entity Descriptions. 2016 AAAI 2659-2665) and Fan et al. (Distributed Representation Learning for Knowledge Graphs with Entity Descriptions, Pattern Recognition Letters 93 (2017), 31-37) explored the semantic information in entity descriptions to advance KG embedding.

C. Problem Statement

Notations:

In this patent document, an uppercase bold letter is used to denote a matrix (e.g., W) and a lower case bold letter to represent a vector (e.g., p). The $i^{th}$ row of a matrix P is denoted as $p_i$. The transpose of a vector is denoted as $p^T$. The $\ell^2$ norm of a vector is denoted as $\|p\|_2$. $\{p_i\}$ is used to represent a sequence of vectors $p_i$. The operation s=[x; h] denotes concatenating column vectors x and h into a new vector s.

Definition 1 (Simple Question) If a natural language question only involves a single head entity and a single predicate in the knowledge graph, and takes their tail entity/entities as the answer, then this question is referred as a simple question.

Some symbols in this patent document are summarize in Table 1. $(h,\ell,t)$ is used to represent a fact, which means that there exists a relation $\ell$ from a head entity h to a tail entity t. Let $\mathcal{G}$ be a knowledge graph that consists of a large number of facts. The total numbers of predicates and entities are represented as M and N. The names of these predicates and entities are given. In one or more embodiments, a scalable KG embedding algorithm, such as TransE and TransR, is applied to $\mathcal{G}$, and the embedding representations of its predicates and entities denoted as P and E, respectively, are obtained. Thus, the vector representations of the $i^{th}$ predicate and $j^{th}$ entity are denoted as $p_i$ and $e_j$ respectively. The relation function defined by the KG embedding algorithm is $f(\cdot)$, i.e., given a fact $(h,\ell,t)$, one may have $e_t \approx f(e_h, \mathbf{P}_\ell)$. Letting Q be a set of simple questions. For each question in Q, the corresponding head entity and predicate are given.

TABLE 1

Some symbols and their definitions

| Notations | Definitions |
|---|---|
| $\mathcal{G}$ | a knowledge graph |
| $(h, \ell, t)$ | a fact, i.e., (head entity, predicate, tail entity) |
| Q | a set of simple questions with ground truth facts |
| M | total number of predicates in $\mathcal{G}$ |
| N | total number of entities in $\mathcal{G}$ |
| d | dimension of the embedding representations |
| $P \in \mathbb{R}^{M \times d}$ | embedding representations of all predicates in $\mathcal{G}$ |
| $E \in \mathbb{R}^{M \times d}$ | embedding representations of all entities in $\mathcal{G}$ |
| $f(\cdot)$ | relation function, given $(h, \ell, t)$, $\Rightarrow e_t \approx f(e_h, \mathbf{P}_\ell)$ |
| $\hat{p}_\ell \in \ell^{1 \times d}$ | predicted predicate representation |
| $\hat{e}_h \in \ell^{1 \times d}$ | predicted head entity representation |
| HED | Head Entity Detection model |
| $HED_{entity}$ | head entity name tokens returned by the HED |
| $HED_{non}$ | non entity name tokens returned by the HED |

The terminology simple question is defined in Definition 1. A simple question may be answered by the machine straightforwardly if its single head entity and single predicate are identified. Given the conditions described above, the knowledge graph embedding based question answering problem is now formally defined as follows:

Given a knowledge graph $\mathcal{G}$ associated with all its predicates' and entities' names and embedding representations P & E, the relation function $f(\cdot)$, as well as a set of simple questions Q associated with corresponding head entities and predicates, embodiments of an end-to-end framework are disclosed to take a new simple question as input and automatically return the corresponding head entity and predicate. Performance of the framework is evaluated by the accuracy of predicting both head entity and predicate correctly.

D. Embodiments of Knowledge Embedding Based QA-KG

Simple questions constitute the majority of questions in the QA-KG problem. Each of them may be answered by the tail entity/entities if the correct head entity and predicate are identified. To accurately predict the head entity and predicate, this patent document discloses embodiments of a Knowledge Embedding based Question Answering (KEQA) framework, which is illustrated in FIG. 1. The KG $\mathcal{G}$ 160 is already embedded into two low-dimensional spaces (Predicate Embedding Space 140 and Entity Embedding Space 150), and each fact $(h, \ell, t)$ may be represented as three latent vectors, i.e., $(e_h, \mathbf{p}_\ell, e_t)$. Thus, given a question 110, as long as its corresponding fact's $e_h$ and $\mathbf{p}_\ell$ may be predicted, this question may be answered 170 correctly. Instead of inferring the head entity and predicate directly, KEQA embodiments target jointly recovering the question's head entity, predicate, and tail entity representations $(\hat{e}_h, \mathbf{p}_\ell, \hat{e}_t)$ in the knowledge graph embedding spaces.

Figure 2:
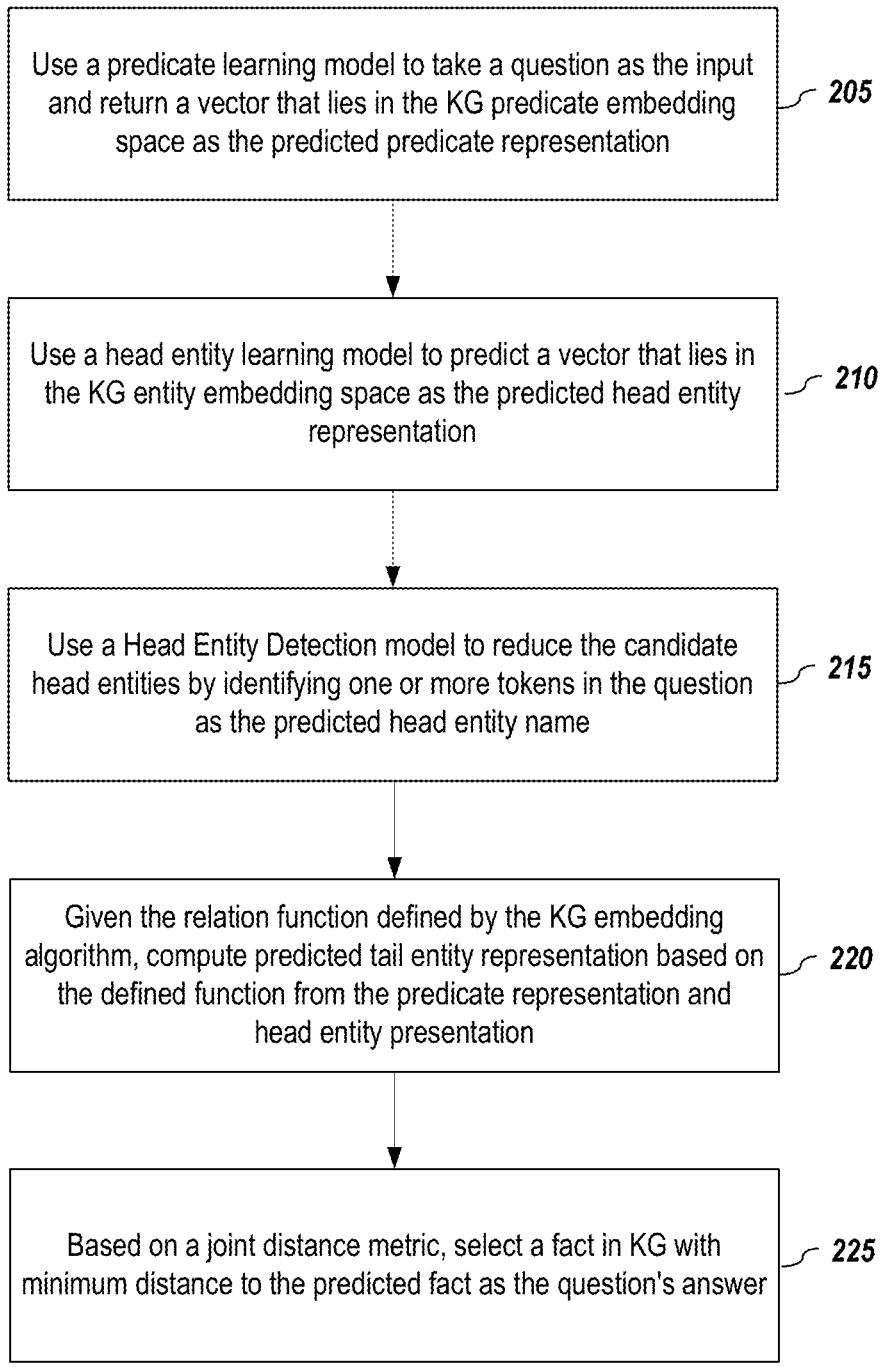
FIG. 2 depicts a method for question answering with a KEQA framework, according to embodiments of the present disclosure.

FIG. 2 depicts a method for question answering with a KEQA framework, according to embodiments of the present disclosure. In one or more embodiments, KEQA achieves an answer via the following steps. (i) Based on the questions in Q and their predicates' embedding representations, KEQA trains (205) a predicate learning model 120 that takes a question 110 as the input and returns a vector $\hat{\mathbf{p}}_\ell$ that lies in the KG predicate embedding space 140 as the predicted predicate representation. Similarly, a head entity learning model 130 is constructed to predict (210) the question's head entity representation $\hat{e}_h$ in the KG entity embedding space 150. (ii) Since the number of entities in a KG is often large, KEQA employs a Head Entity Detection model to reduce (215) the candidate head entities. A main goal is to identify one or more tokens in the question as the predicted head entity name, then the search space in $\mathcal{G}$ is reduced from the entire entities to a number of entities with the same or similar names. Then, $\hat{e}_h$ is mainly used to tackle the ambiguity challenge. (iii) Given the relation function $f(\cdot)$ defined by the KG embedding algorithm, the KEQA embodiment computes (220) the predicted tail entity representation $\hat{e}_t = f(\hat{e}_h, \hat{\mathbf{p}}_\ell)$. The predicted predicate representation $\hat{\mathbf{p}}_\ell$, the predicted head entity representation $\hat{e}_h$, and the predicted tail entity representation $\hat{e}_t$ form predicted fact $(\hat{e}_h, \hat{\mathbf{p}}_\ell, \hat{e}_t)$. Based on a carefully-designed joint distance metric, the predicted fact $(\hat{e}_h, \hat{\mathbf{p}}_\ell, \hat{e}_t)$'s closest fact in $\mathcal{G}$ is selected (225) and returned as the question's answer 170.

1. Embodiments of Knowledge Graph Embedding

In one or more embodiments, the disclosed framework KEQA employs the embedding representations of all predicates P and entities E as the infrastructure. In one or more embodiments, an existing KG embedding algorithm may be utilized to learn P and E. Examples of existing KG embedding methods that may be used include, but are not limited to, TransE, TransR, TransH, etc.

Knowledge graph embedding aims to represent each predicate/entity in a KG as a low-dimensional vector, such that the original structures and relations in the KG are preserved in these learned vectors. A core idea of most of the existing KG embedding methods could be summarized as follows. For each fact $(h, \ell, t)$ in $\mathcal{G}$, its embedding representations is denoted as $(e_h, \mathbf{p}_\ell, e_t)$. The embedding algorithm initializes the values of $e_h$, $\mathbf{p}_\ell$, and $e_t$ randomly or based on the trained word embedding models. Then, a function $f(\cdot)$ that measures the relation of a fact $(h, \ell, t)$ in the embedding spaces is defined, i.e., $e_t \approx f(e_h, \mathbf{p}_\ell)$. For example, TransE defines the relation as $e_t \approx e_h + \mathbf{p}_\ell$ and TransR defines it as $e_t \mathbf{M}_\ell \approx e_h \mathbf{M}_\ell + \mathbf{p}_\ell$, where $\mathbf{M}_\ell$ is a transform matrix of predicate $\ell$. Finally, the embedding algorithm minimizes the overall distance between $e_t$ and $f(e_h, \mathbf{p}_\ell)$, for all the facts in $\mathcal{G}$. A typical way is to define a margin-based ranking criterion and train on both positive and negative samples, i.e., facts and synthetic facts that do not exist in $\mathcal{G}$.

As shown in FIG. 1, the surface is defined where the learned predicate representations $\{p_i\}$ for $i=1, \ldots, M$ lie in, as the predicate embedding space. The surface where $\{e_i\}$ for $i=1, \ldots, N$ lie in is denoted as the entity embedding space.

2. Embodiments of Predicate and Head Entity Learning Models

Given a simple question, the objective is to find a point in the predicate embedding space as its predicate representation $\hat{\mathbf{p}}_\ell$, and a point in the entity embedding space as its head entity representations $\hat{e}_h$.

Figure 3:
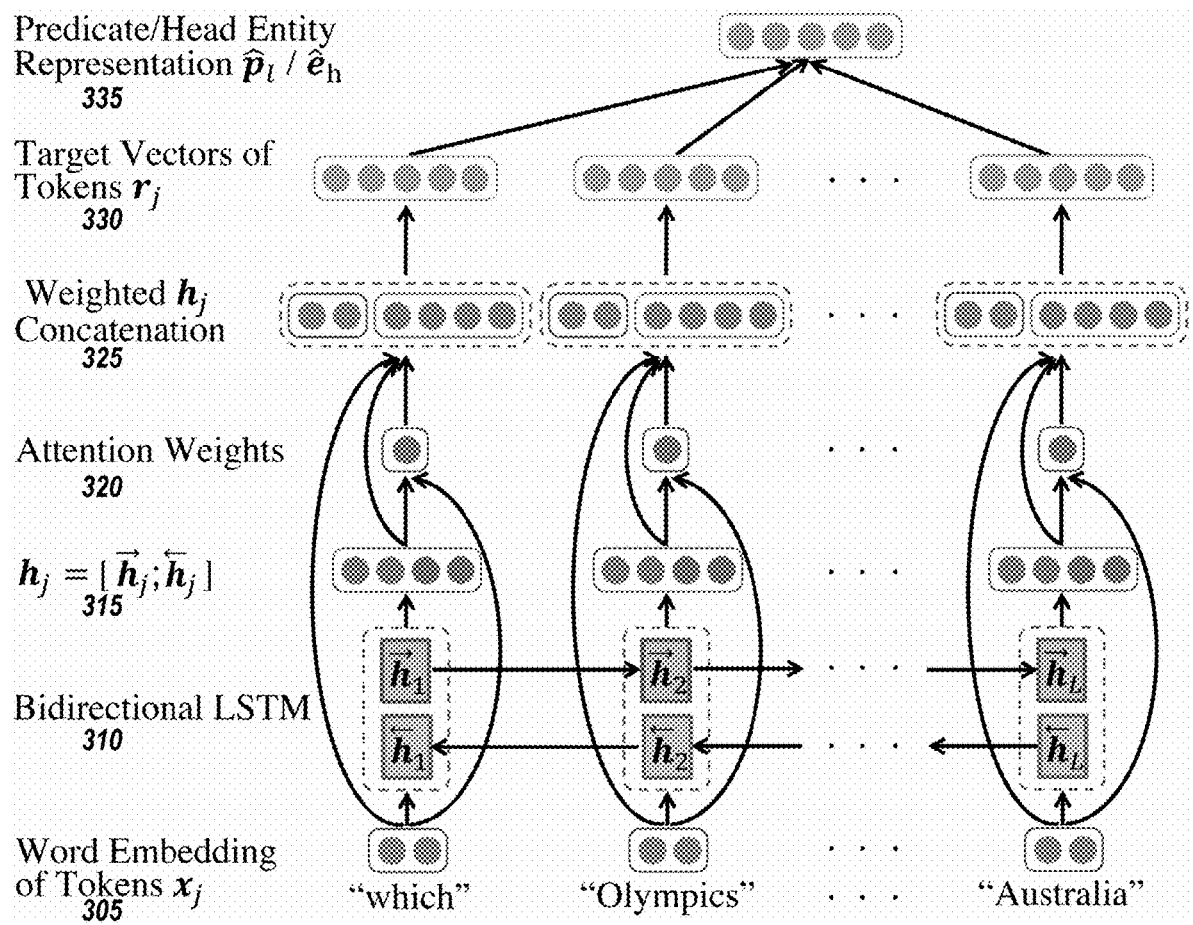
FIG. 3 graphically depicts architecture of predicate and head entity learning models, according to embodiments of the present disclosure.

In one or more embodiments, for all the questions that can be answered by $\mathcal{G}$, their predicates' vector representations should lie in the predicate embedding space. Thus, an aim is to design a model that takes a question as the input and returns a vector $\hat{\mathbf{p}}_\ell$ that is as close as possible to this question's predicate embedding representation $\mathbf{p}_\ell$. To achieve this goal, a neural network architecture embodiment, as shown in FIG. 3, is employed. In one or more embodiments, the architecture mainly comprises a bidirectional recurrent neural network layer 310 and an attention layer 325. In one or more embodiments, the bidirectional recurrent neural network layer 310 is a bidirectional long short-term memory (LSTM). A core idea is to take the order and the importance of words into consideration. Words with different orders could have different meanings, and the importance of words could be different. For example, the entity name related words in a question often have less contribution to the predicate learning model.

Neural Network Based Predicate Representation Learning.

To Predict the Predicate of a question, a traditional solution is to learn the mapping based on the semantic parsing and manually-created lexicons, or simply consider each type of predicate as a label category to transform it into a classification problem. However, since the domains of end users' questions are often unbounded, a new question's predicate might be different from all the ones in the training data. The traditional solutions could not handle this scenario. In addition, it is observed that the global relation information preserved in P and E is available and could be potentially used to improve the overall question answering accuracy. To bridge the gap, embodiments of a predicate learning model based on neural networks are set forth herein.

Figure 4:
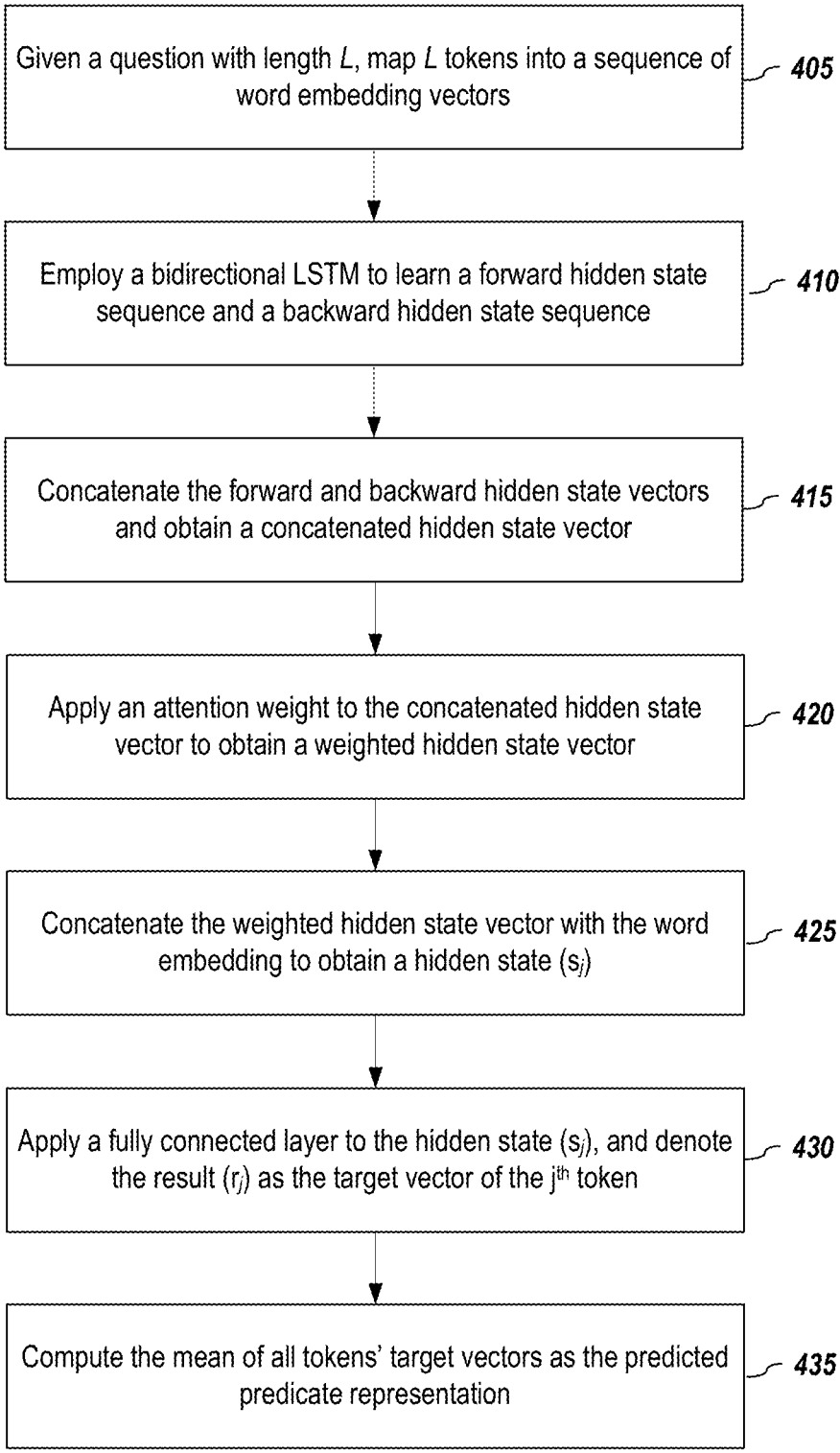
FIG. 4 depicts a method for predicting predicate of an input question using a predicate and head entity learning model, according to embodiments of the present disclosure.

With the long short-term memory (LSTM) as a typical example of the recurrent neural network, FIG. 3 illustrates the architecture of predicate and head entity learning models, according to one or more embodiments of the present disclosure. FIG. 4 depicts a method for predicting a predicate of an input question using a predicate and head entity learning model, according to embodiments of the present disclosure. Given a question with length L, its L tokens are first mapped (405) into a sequence of word embedding vectors $\{x_1\}$ 305, for $j=1, \ldots, L$, based on a pre-trained model, such as GloVe (Pennington, et al., GloVe: Global Vectors for Word Representation, In EMNLP. 1532-1543), although other embedding techniques may be employed. Then, a bidirectional LSTM 310 is employed (410) to learn a forward hidden state sequence $(\vec{h}_1, \vec{h}_2, \ldots, \vec{h}_L)$ and a backward hidden state sequence $(\overleftarrow{h}_1, \overleftarrow{h}_2, \ldots, \overleftarrow{h}_L)$. Taking the backward one as an example, $\{\overleftarrow{h}_j\}$ are computed via the following equations.

$$f_j = \sigma(W_{xf}x_j + W_{hf}\overleftarrow{h}_{j+1} + b_f) \quad (1)$$

$$i_j = \sigma(W_{xi}x_j + W_{hi}\overleftarrow{h}_{j+1} + b_i) \quad (2)$$

$$o_j = \sigma(W_{xo}x_j + W_{ho}\overleftarrow{h}_{j+1} + b_o) \quad (3)$$

$$c_j = f_j \circ c_{j+1} + i_j \tanh(W_{xc}x_j + W_{hc}\overleftarrow{h}_{j+1} + b_c) \quad (4)$$

$$\overleftarrow{h}_j = o_j \circ \tanh(c_j) \quad (5)$$

where $f_j$, $i_j$, and $o_j$ are the forget, input, and output gates' activation vectors respectively. $c_j$ is the cell state vector. $\sigma$ and tanh are the sigmoid and Hyperbolic tangent functions. $\circ$ denotes the Hadamard product. Concatenating (415) the forward and backward hidden state vectors, one may obtain concatenated hidden state vector $h_j = [\overrightarrow{h}_j; \overleftarrow{h}_j]$ 315.

In one or more embodiments, the attention weight 320 of the $j^{th}$ token, i.e., $\alpha_j$, is calculated based on the following formulas:

$$\alpha_j = \frac{\exp(q_j)}{\sum_{i=1}^{L} \exp(q_j)} \quad (6)$$

$$q_j = \tanh(w^\top [x_j; h_j] + b_q) \quad (7)$$

where $b_q$ is a bias term. The attention weight $\alpha_j$ may be applied (420) to $h_j$ to obtain a weighted hidden state vector, which is then concatenated (425) with the word embedding $x_j$, resulting a hidden state $s_j = [x_j; \alpha_j h_j]$ 325. A fully connected layer is then applied (430) to $s_j$, and its result, $r_j \in \mathbb{R}^{d \times 1}$, is denoted as the target vector 330 of the $j^{th}$ token. The predicted predicate representation $\hat{p}_\ell$ 335 may be computed (435) as the mean of all tokens' target vectors, that is:

$$\hat{p}_\ell = \frac{1}{L} \sum_{j=1}^{L} r_j^\top \quad (8)$$

In one or more embodiments, all the weight matrices, weight vector w, and bias terms are calculated based on the training data, i.e., questions Q in and their predicates' embedding representations.

Neural Network based Head Entity Learning Model.

In one or more embodiments, given a question, instead of inferring the head entity directly, a target is recovering its representation in the KG embedding space. Thus, a goal of the head entity learning model is to compute a vector $\hat{e}_h$ that is as close as possible to this question's head entity embedding representation. Similar to the computation of $\hat{p}_\ell$, the same neural network architecture in FIG. 3 may be used to obtain the predicted head entity representation $\hat{e}_h$.

However, the number of entities in a KG is often large, and it could be expensive and noisy when comparing $\hat{e}_h$ with all entity embedding representations in E. To make the learning more efficient and effective, KEQA embodiments may employ a head entity detection model to reduce the number of candidate head entities.

3. Embodiments of Head Entity Detection Model

In this step, the goal is to select one or several successive tokens in a question, as the name of the head entity, such that the search space could be reduced from the entire entities to a number of entities with the same or similar names. Then the main role of $\hat{e}_h$ would become handling the ambiguity challenge.

Figure 5:
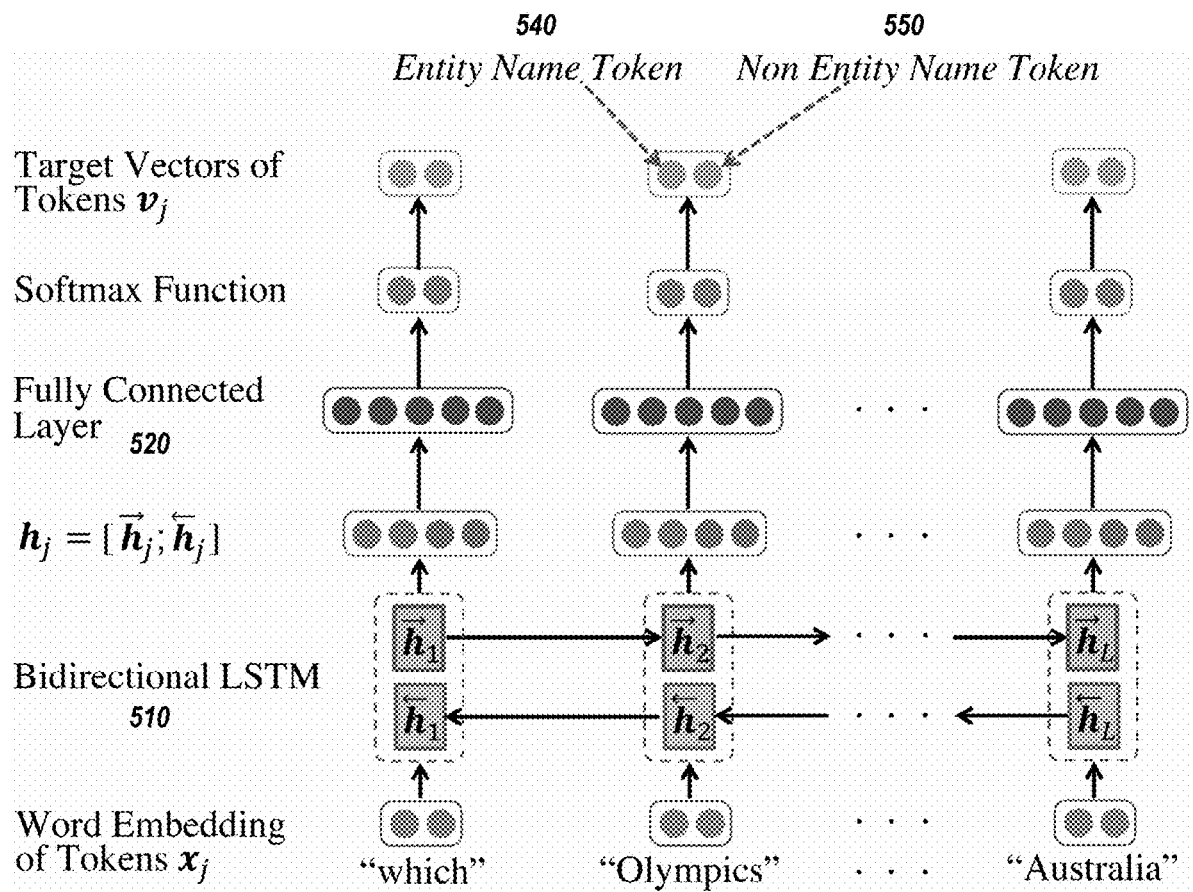
FIG. 5 depicts a structure of a Head Entity Detection (HED) model, according to embodiments of the present disclosure.

In one or more embodiments, to make the framework simple, a bidirectional recurrent neural network (e.g., LSTM) based model is employed to perform the head entity token detection task. FIG. 5 shows an architecture of a Head Entity Detection (HED) model, according to one or more embodiments of the present disclosure. As shown in FIG. 5, the HED model comprise a bidirectional LSTM 510 and a fully connected layer 520. The HED model has a similar structure to the one in predicate/head entity learning models, but without the attention layer.

Figure 6:
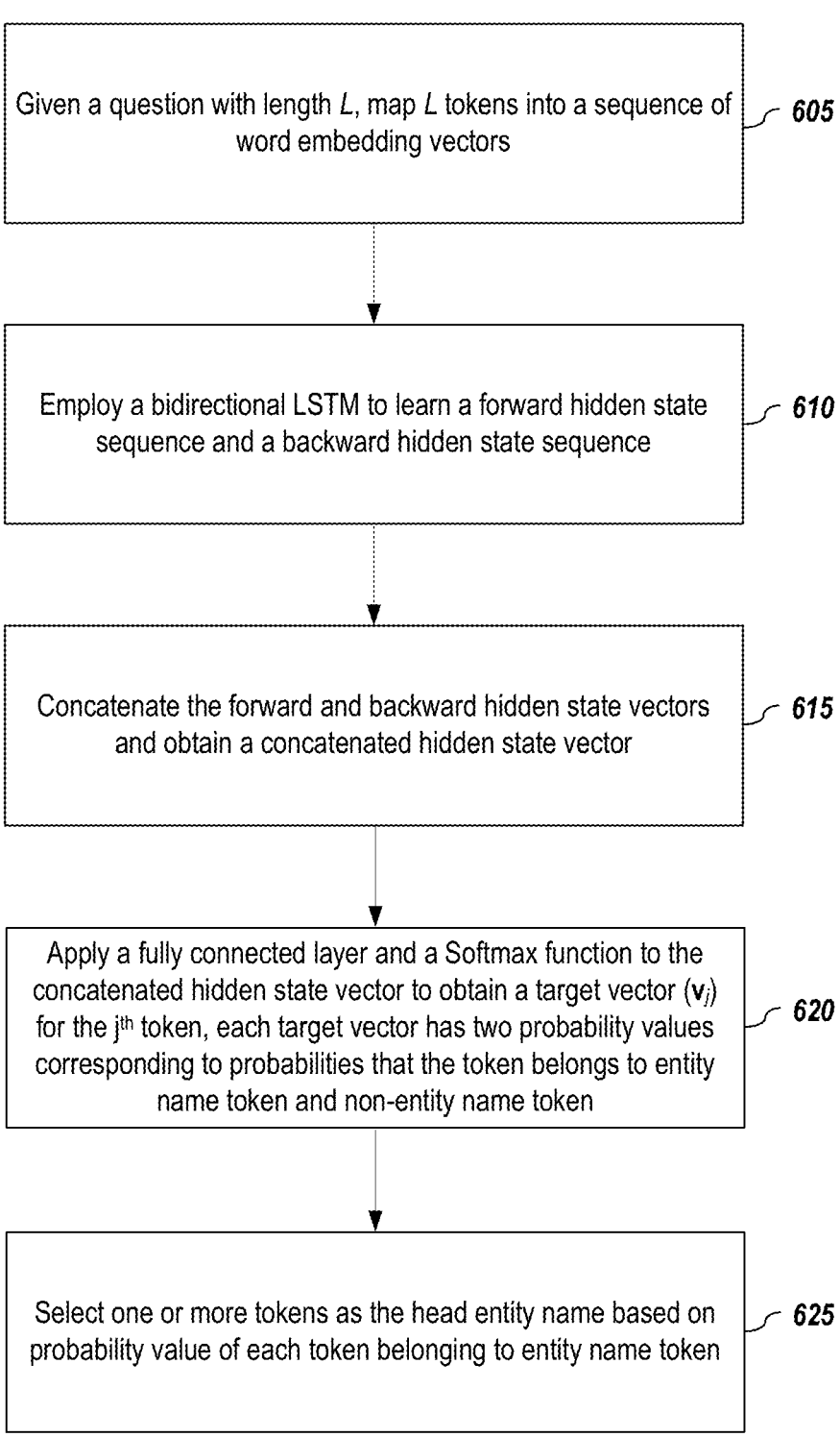
FIG. 6 depicts a method for identifying one or more head entities of an input question using a HED model, according to embodiments of the present disclosure.

FIG. 6 depicts a method for identifying one or more head entities of an input question using a HED model, according to one or more embodiments of the present disclosure. In one or more embodiments, the question is first mapped (605) into a sequence of word embedding vectors $\{x_j\}$, for j= 1, . . . , L, and then a bidirectional recurrent neural network is applied (610) to $x_j$ to learn a forward hidden state sequence $\overrightarrow{h}_j$ and a backward hidden state sequence $\overleftarrow{h}_j$. The forward and backward hidden states are concatenated (615) into a concatenated hidden state $h_j = [\overrightarrow{h}_j; \overleftarrow{h}_j]$. A fully connected layer and a softmax function are then applied (620) to $h_j$, resulting the target vector $v_j \in \mathbb{R}^{2 \times 1}$. The two values in $v_j$ are corresponding to the probabilities that the $j^{th}$ token belongs to the two label categories, i.e., entity name token and non-entity name token. In such a way, each token is classified and one or several tokens are recognized as the head entity name. These tokens are denoted as $HED_{entity}$, and the remaining tokens in the question are denoted as $HED_{non}$. One or more tokens are selected (625) as the head entity name based on probability value of each token belonging to entity name token.

In one or more embodiments, the questions in Q and their head entity names are used as the training data to train the HED model. Since entity name tokens in these questions are successive, the trained model would also return successive tokens as $HED_{entity}$ with a high probability. If discrete $HED_{entity}$ is returned, then each successive part would be considered as an independent head entity name. It should be noted that $HED_{entity}$ might be only part of the correct head entity name. Thus, all entities that are the same as or contain $HED_{entity}$ would be included as the candidate head entities, which might still be large since many entities would share the same names in a large KG.

4. Embodiments of Joint Search on Embedding Spaces

For each new simple question, with its predicate and head entity representations $\hat{p}_\ell$ and $\hat{e}_h$, as well as its candidate head entities being predicted, the goal is to find a fact in $\mathcal{G}$ that matches these learned representations and candidates the most.

Joint Distance Metric.

If a fact's head entity belongs to the candidate head entities, it is named as a candidate fact. Let C be a set that collects all the candidate facts. To measure the distance between a candidate fact $(h, \ell, t)$ and the predicted representations $(\hat{e}_h, \hat{p}_\ell)$, an intuitive solution is to represent $(h, \ell, t)$ as $(e_h, p_\ell)$ and define the distance metric as the sum of the distance between $e_h$ and $\hat{e}_h$ and distance between $p_\ell$ and $\hat{p}_\ell$.

This solution, however, does not take the meaningful relation information preserved in the KG embedding representations into consideration.

In one or more embodiments, a joint distance metric used that takes advantage of the relation information $e_t \approx f(e_h, \mathbf{p}_\ell)$. Mathematically, the proposed joint distance metric may be defined as:

$$\underset{(h,\ell,t)\in C}{\text{minimize}} \|p_\ell - \hat{p}_\ell\|_2 + \beta_1 \|e_h - \hat{e}_h\|_2 + \beta_2 \|f(e_h, p_\ell) - \hat{e}_t\|_2 - \quad (9)$$
$$\beta_3 sim[n(h), HED_{entity}] - \beta_4 sim[n(\ell), HED_{non}]$$

where $\hat{e}_t = f(\hat{e}_h, \hat{\mathbf{p}}_\ell)$. Function $n(\cdot)$ returns the name of the entity or predicate. $HED_{entity}$ and $HER_{non}$ denote the tokens that are classified as entity name and non-entity name by the HED model. Function $sim[.,.]$ measures the similarity of two strings. $\beta_1$, $\beta_2$, $\beta_3$, and $\beta_4$ are predefined weights to balance the contribution of each term. In one or more embodiments, $\ell^2$ norm is used to measure the distance, and it is straightforward to extend to other vector distance measures.

The first three terms (which may be referred to as vector distance terms in Eq. (9) measure the distance between a fact (h, $\ell$, t) and the prediction in the KG embedding spaces. In one or more embodiments, $f(e_h, \mathbf{p}_\ell)$ is used to represent the tail entity's embedding vector, instead of $e_t$. In other words, the tail entity embedding vector of the candidate fact used in the joint distance metric is calculated using the defined function $f(\cdot)$ defined by the KG, from a head entity embedding vector and a predicate embedding vector of the candidate fact. This is because in a KG, there might be several facts that have the same head entity and predicate, but different tail entities. Thus, a single tail entity $e_t$ might not be able to answer the question. Meanwhile, $f(e_h, \mathbf{p}_\ell)$ matches the predicted tail entity $\hat{e}_t$ since it is also inferred based on $f(\cdot)$. It is tended to select a fact with head entity name exactly the same as $HED_{entity}$, and with predicate name mentioned by the question. In one or more embodiments, these two goals are achieved via the fourth and fifth terms (referred as string similarity terms in Eq. (9) respectively. In one or more embodiments, the string similarity terms are incorporated in the joint distance metric to help select a fact with the head entity name exactly the same as $HED_{entity}$, and with predicate name mentioned by the question. The fact (h*, $\ell$*, t*) that minimizes the objective function is returned.

Knowledge Embedding based Question Answering.

The entire processes of a KEQA embodiments is summarized in Methodology 1. Given a KG $\mathcal{G}$ and a question set Q with corresponding answers, a predicate learning model, a head entity learning model, and a HED model are trained, as shown from line 1 to line 9. Then, for any new simple question Q, it is input into the trained predicate learning model, head entity learning model, and HED model to learn its predicted predicate representation $\hat{\mathbf{p}}_\ell$, head entity representation $\hat{e}_h$, entity name tokens $HED_{entity}$, and non-entity name tokens $HED_{non}$. Based on the learned entity name/names in $HED_{entity}$, the entire $\mathcal{G}$ is searched to find the candidate fact set C. For all facts in C, their joint distances to the predicted representations ($\hat{e}_h$, $\hat{\mathbf{p}}_\ell$, $\hat{e}_t$) are computed based on the objective function in Eq. (9). The fact (h*, $\ell$, t*) with the minimum distance is selected. Finally, the head entity h* and predicate $\ell$* are returned as the answer of Q.

---

Methodology 1: A KEQA framework embodiment

Input: $\mathcal{G}$, predicates' and entities' names, P, E, Q, a new simple question Q.
Output: head entity h* and predicate $\ell^*$.
/*Training the predicate learning model:                    */
1   for $Q_i$ in Q do
2   |    Take the L tokens of $Q_i$ as the input and its predicate $\ell$ as the label to train, as
    |    shown in Figure 3;
3   |    Update weight matrices {W}, w, {b}, and $b_q$ to minimize the predicate objective function $\left\| p_\ell - \frac{1}{L}\sum_{j=1}^{L} r_j^T \right\|_2$ /*Training the head entity learning model:                  */
4   for $Q_i$ in Q do
5   |    Take the L tokens of $Q_i$ as the input and its head entity h as the label to train, as
    |    shown in Figure 3;
6   |    Update weight matrices and bias terms to minimize the head entity objective function $\left\| e_h - \frac{1}{L}\sum_{j=1}^{L} r_j^T \right\|_2$ /*Training the HED model:                                   */
7   for $Q_i$ in Q do
8   |    Take the L tokens of $Q_i$ as the input and its head entity name positions as the label
    |    to train;
9   |    Update weight matrices and bias as shown in Figure 5
    /*Question answering processes:                          */
10  Input Q into the predicate learning model to learn $\hat{\mathbf{p}}_\ell$;
11  Input Q into the head entity learning model to learn $\hat{e}_h$;
12  Input Q into the HED model to learn $HED_{entity}$ and $HED_{non}$;
13  Find the candidate fact set C from $\mathcal{G}$, based on $HED_{entity}$;
14  For all facts in C, calculate the fact (h*, $\ell$*, t*) that minimizes the objective function in Eq. (9).

By way of example related to step 12 (above), from a HED model, the result in FIG. 5 would be that "Australia" would have a high probability of being an entity name token. By way of another example, in one or more embodiments, a phrase that contained "President Abraham Lincoln" would return results with each of the words "Abraham" and "Lincoln" having high probabilities of being combined, at least because the tokens consecutive and/or the tokens are name related, together as one entity.

Figure 7:
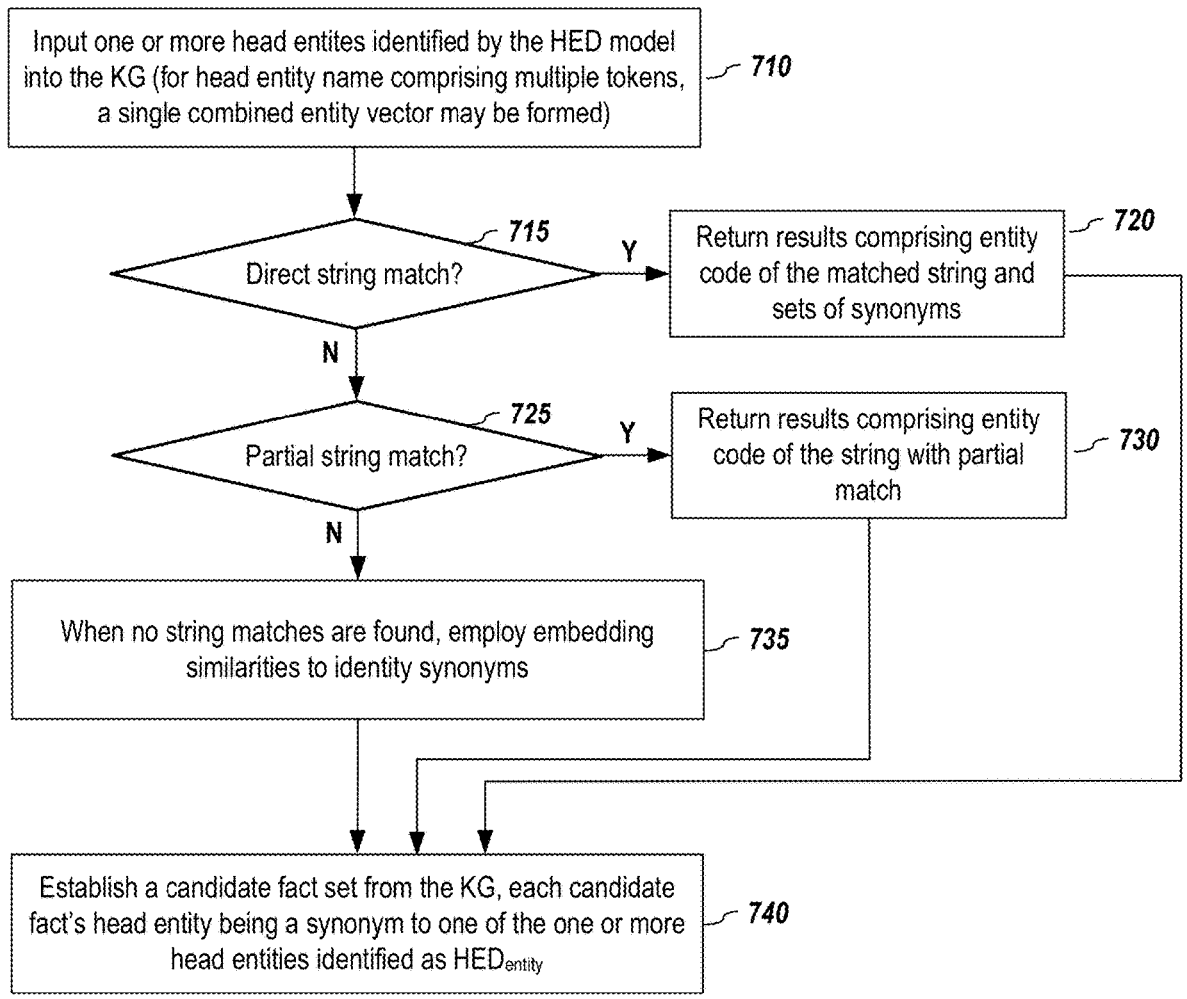
FIG. 7 depicts a method for searching head entity synonyms in a KG using head entity names identified by a HED model, according to embodiments of the present disclosure.

FIG. 7 depicts an embodiment implementation of step 13 (above), according to one or more embodiments of the present disclosure. FIG. 7 illustrates an approach for searching head entity synonyms in a KG using head entity names identified by a HED model, according to embodiments of the present disclosure. $HED_{entity}$ may be a single entity, or it may contain several entities. In one or more embodiments, one or more entities identified as head entity by the HED model are input (710) into a KG, which comprises entities, predicates, their unique code, and set of synonyms and their embeddings. An entity may comprise one or more tokens, such as "President Abraham Lincoln." Thus, in one or more embodiments, for candidate entity comprising multiple tokens, an entity vector may be formed, such as by a dot product of entity vectors of each token of the entity. In one or more embodiments, the search strategy comprises searching the KG with embedding comparison, string matching, or both, for each identified head entity.

In one or more embodiments, upon determining (715) whether a direct string match exists for each identified head entity, the process either goes to returning (720) results, which results may comprise entity code of the matched string and a set or sets of synonyms. In one or more embodiments, if a direct string match is not found, the search may be extended to attempt to identify (725) whether one or more partial string matches exists. For example, the two strings "President Abraham Lincoln" and "the President of the United States during the Civil War" are partial matched and also regarded to be the same entity. If one or more partial string matches are identified, the search process returns (730) results, which may comprise, for each partial match, its entity code of one or more sets of synonyms. In one or more embodiments, in response to no direct or partial string matches being found, embedding similarities are employed to identity (735) head entity synonyms for each identified head entity. All synonyms for the identified head entity via direct string match, partial string match, and embedding similarity are collected together to establish (740) a candidate fact set for the one or more identified head entities.

In one or more embodiments, for each search strategy (string match and embedding comparison), a threshold or thresholds may be used to decide whether enough similarity or matching exists. The threshold in string match may or may not the same as the threshold for embedding comparison.

By way of further illustration related to steps 13 and 14 (above), once a set of candidate head entities are found (e.g., from a search process such as that shown in FIG. 7), a candidate fact set C can be constructed based on a set of found head entities, the predicate from the Q found in training, and the tail entity, which is known from the training data. Given the constructed candidate fact set with the known tail entity (or ground truth) from the training data, the candidate fact set may be put into Eq. (9) for joint training of models in the KEQA framework. Once the training is done, the KEQA framework may be used to predict tail entity for new question Q in a testing data.

It shall be noted that these training embodiments and results are provided by way of illustration and were performed under specific conditions using a specific embodiment or embodiments; accordingly, neither these training embodiments nor their results shall be used to limit the scope of the disclosure of the current patent document.

By way of general summary, the disclosed framework KEQA embodiments enjoy several nice properties. First, by performing question answering based on the KG embedding, KEQA embodiments are able to handle questions with predicates and entities that are different from all the ones in the training data. Second, by taking advantage of the structure and relation information preserved in the KG embedding representations, KEQA embodiments can perform the head entity, predicate, and tail entity predictions jointly. The three subtasks would mutually complement each other. Third, KEQA framework is generalizable to different KG embedding algorithms. Thus, the performance of a KEQA embodiment may be further improved by more sophisticated KG embedding algorithms.

E. Some Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

In this section, the effectiveness and generalizability of tested embodiments of the disclosed framework KEQA on a large QA-KG benchmark are evaluated. In one or more experiments, the following three research questions are studied:

Q1: How effective is the KEQA embodiment compared with the state-of-the-art QA-KG methods w.r.t. different freebase subsets?

Q2: How does the performance of the KEQA embodiment vary when different KG embedding algorithms are employed?

Q3: The objective function of the KEQA embodiment comprises five terms as shown in Eq. (9). How much does each term contribute?

1. Embodiments of Datasets

In this section, the knowledge graph subsets and question answering dataset used in the experiments are first introduced. All the data are publicly available. Their statistics are shown in Table 2.

TABLE 2

The statistics of the question answering datasets

|  | FB2M | FB5M | SimpleQuestions |
|---|---|---|---|
| # Training | 14,174,246 | 17,872,174 | 75,910 |
| # Validation | N.A. | N.A. | 10,845 |
| # Test | N.A. | N.A. | 21,687 |
| # Predicates (M) | 6,701 | 7,523 | 1,837 |
| # Entities (N) | 1,963,130 | 3,988,105 | 131,681 |
| Vocabulary Size | 733,278 | 1,213,205 | 61,336 |

FB2M and FB5M: Freebase is often regarded as a reliable KG since it is collected and trimmed mainly by the community members. Two large subsets of freebase are employed in this paper, i.e., FB2M and FB5M. Their predicate number M and entity number N are list in Table 2. The repeated facts have been deleted. The application programming interface (API) of freebase is no long available. Thus, an entity name collection may be used to build the mapping between entities and their names.

SimpleQuestions (Borders, et al., Scale Simple Question Answering with Memory Networks. 2015 arXiv preprint: 1506.02075): It contains more than ten thousand simple questions associated with corresponding facts. All these facts belong to FB2M. All questions are phrased by English speakers based on the facts and their context. It has been used as the benchmark for various recent QA-KG methods.

2. Experiment Settings

In one or more embodiments, to evaluate the performance of the QA-KG methods, traditional settings and use the same training, validation and test splits that are originally provided in SimpleQuestions are used. Either FB2M or FB5M is employed as the KG. Then a KG embedding algorithm, such as TransE and TransR, is applied to learn the P and E. It should be noted that P and E are not extra information sources. Then, a QA-KG method is applied to predict the head entity and predicate of each question in the test split. Its performance is measured by the accuracy of predicting both head entity and predicate correctly.

As claimed in the formal problem definition, the evaluation criterion is defined as the accuracy of predicting a new question' both head entity and predicate correctly. The dimension of the KG embedding representations d is set to be 250. A pre-trained word embedding based on GloVe is used. In one or more embodiments, to measure the similarity of two string, i.e., to build the function sim[.,.], implementation Fuzzy is used. If it is not specific, the KG embedding algorithm TransE would be employed to learn the embedding representations of all predicates P and entities E.

3. Effectiveness of the Tested KEQA Embodiments

The first research question asked at the beginning of this section, i.e., how effective is KEQA, is now answered. In one or more embodiments, 7 state-of-the-art QA-KG algorithms and one variation of KEQA are included as the baselines.

Bordes et al. (Large Scale Simple Question Answering with Memory Networks. arXiv preprint 1506.02075): It learns latent representations for words, predicates, and entities, based on the training questions, such that a new question and candidate facts could be projected into the same space and compared.

Dai et al. (CFO: Conditional Focused Neural Question Answering with Large-Scale Knowledge Bases. arXiv preprint arXiv:1606.01994): It employs a bidirectional gated recurrent units based neural network to rank the candidate predicates. Suggestions from the freebase API are used.

Yin et al. (Simple Question Answering by Attentive Convolutional Neural Network, 2016 COLING. 1746-1756): It employs a character-level convolutional neural network to match the questions and predicates.

Golub and He (Character-Level Question Answering with Attention. In EMNLP. 1598-1607): It designs a character-level and attention-based LSTM to encode and decode questions.

Bao et al. (Constraint-Based Question Answering with Knowledge Graph. In COLING. 2503-2514): It manually defines several types of constraints and performs constraint learning to handle complex questions, in which each question is related to several facts. Extra training questions and freebase API are used.

Lukovnikov et al. (Neural Network-Based Question Answering over Knowledge Graphs on Word and Character Level. In WWW. 1211-1220): It utilizes a character-level gated recurrent units neural network to project questions and predicates/entities into the same space.

Mohammed et al. (Strong Baselines for Simple Question Answering over Knowledge Graphs with and without Neural Networks, In NAACL-HLT. 291-296): It treats the predicate prediction as a classification problem and uses different neural networks to solve it. It performs entity linking based on Fuzzy.

KEQA_noEmbed: No KG embedding algorithm is used. Instead, it generates the predicate and entity embedding representations P and E randomly.

As shown in the introduction above, all the baselines have taken advantage of deep learning models to advance their methods. Their results reported in the corresponding papers or the authors' implementations are used. The performance of different methods on SimpleQuestions with respect to FB2M and FB5M is listed in Table 3.

TABLE 3

Performance of all methods on SimpleQuestions

| | FB2M (Accuracy) | FB5M |
|---|---|---|
| Bordes et al. | 0.627 | 0.639 |
| Dai et al. | N.A. | 0.626 |
| Yin et al. | 0.683 (+8.9%) | 0.672 |
| Golub and He | 0.709 (+13.1%) | 0.703 |
| Bao et al. | 0.728 (+16.1%) | Entire Freebase |
| Lukovnikov et al. | 0.712 (+13.6%) | N.A. |
| Mohammed et al. | 0.732 (+16.7%) | N.A. |
| KEQA_noEmbed | 0.731 (+16.6%) | 0.726 |
| KEQA | 0.754 (+20.3%) | 0.749 |

As mentioned by several other work by Lukovnikov et al. and Mohammed et al., a few algorithms achieve high accuracy, but they either used extra information sources or have no available implementations. The extra training data freebase API suggestions, freebase entity linking results, and trained segmentation models. These rely on the freebase API, which is no longer available. Instead, the presented framework KEQA embodiment uses an entity name collection. Thus, for Dai et al. and Yin et al., their results are reported when no extra training data is used. There are two work claimed much good accuracy, but without publicly available implementations. Thus, it was not possible to replicate them, which has also been pointed out by other work.

From the results in Table 3, three observations are taken. First, the proposed framework KEQA outperforms all the baselines. KEQA achieves 20.3% improvement comparing to the accuracy when SimpleQuestions was released. Second, KEQA achieves 3.1% higher accuracy compared to KEQA_noEmbed. It demonstrates that the separate task KG embedding indeed could help the question answering task. Third, the performance of KEQA decreases 0.7% when applied to FB5M. It is because all the ground truth facts belong to FB2M, and FB5M has 26.1% more facts than FB2M.

By jointly predicting the question's predicate and head entity, KEQA achieves an accuracy of 0.754. In the predicate prediction subtask, KEQA achieves an accuracy of 0.815 on the validation split, which is worse than the most recent one 0.828 achieved by Mohammed et al. This gap suggests that the presented KEQA framework in this patent document might be further improved by a more sophisticated model. Nevertheless, KEQA still outperforms Mohammed et al. in the simple question answering task. This confirms the effectiveness of the presented jointly learning framework. Through the jointly learning, KEQA achieves an accuracy of 0.816 in predicting the head entity, 0.754 in predicting both head entity and predicate, and 0.680 in predicting the entire fact, on the test split and FB2M. It implies that some of the ground truth facts do not exist in FB2M.

4. Embodiments of Generalizability and Robustness Evaluation

E.4.1 Generalizability of KEQA.

In one or more embodiments, to study how general is KEQA when different KG embedding algorithms are used, three scalable KG embedding methods are included in the comparison. Detailed introductions are listed as follows:

KEQA_TransE: TransE is used to perform the KG embedding. It is a typical translation-based method. It defines the relation function as $e_t \approx f(e_h, \mathbf{P}_\ell) = e_h + \mathbf{P}_\ell$, and then performs the margin-based ranking to make all the facts approach to satisfy the relation function.

KEQA_TransH: TransH is used to perform the KG embedding. TransH is similar to TransE, and defines the relation function as $e_t^\perp \approx e_h^\perp + \mathbf{P}_\ell$, where $e_t^\perp = e_t - \mathbf{m}_\ell^\top e_t \mathbf{m}_\ell$ and $\mathbf{m}_\ell$ is the hyperplane of predicate $\ell$.

KEQA_TransR: TransR is similar to TransE, and defines the relation function as $e_t \mathbf{M}_\ell \approx e_h \mathbf{M}_\ell + \mathbf{P}_\ell$, where $\mathbf{M}_\ell$ is a transform matrix of $\ell$.

The performance of KEQA when not using the KG embedding and when using different KG embedding algorithms is shown in Table 4. From the results, three major observations are obtained. First, the KG embedding algorithms have improved the performance of KEQA. For example, KEQA achieves 3.1% improvement when it is based on TransE, comparing to KEQA_noEmbed. Second, KEQA has similar performance when using different KG embedding algorithms. It demonstrates the generalizability of KEQA. Third, even when not using the KG embedding, KEQA could still achieve comparable performance to the state-of-the-art QA-KG methods as shown in Table 3. It validates the robustness of KEQA. The reason that randomly-generated P and E could achieve comparable performance is that it tends to make all $\mathbf{P}_\ell$ uniformly distributed and far away from each other. This would convert the representation prediction problem to a one that is similar to the classification task.

TABLE 4

The performance of KEQA with different knowledge graph embedding algorithm on FB2M

|  | SimpleQuestions | SimpleQ_Missing |
| --- | --- | --- |
| KEQA_noEmbed | 0.731 | 0.386 |
| KEQA_TransE | 0.754 (+3.1%) | 0.418 (+8.3%) |
| KEQA_TransH | 0.749 (+2.5%) | 0.411 (+6.5%) |
| KEQA_TransR | 0.753 (+3.0%) | 0.417 (+8.0%) |

4.2 Robustness of KEQA.

To further validate the robustness of KEQA, all the 108,442 questions in SimpleQuestions are reshuffled and a new dataset named SimpleQ_Missing is obtained. In one or more embodiments, to perform the reshuffle, all the types of predicates are randomly split into three groups, and assign questions to these groups based on the predicates. Thus, in SimpleQ_Missing, all the corresponding predicates of the questions in the test split have never been mentioned in the training and validation splits. In the end, 75,474 questions in the training split, 11,017 questions in the validation split, and 21,951 questions in the test split are obtained, which are roughly the same ratios as the ones in SimpleQuestions. The performance of KEQA with different KG embedding algorithms on SimpleQ_Missing is shown in Table 4.

From the results in Table 4, it is observed that KEQA could still achieve an accuracy of 0.418 with the help of TransE. The global relation and structure information preserved in the KG embedding representations P and E enables KEQA to perform 8.3% better than Random. These observations demonstrate the robustness of KEQA.

5. Embodiments of Parameter Analysis

In this section, investigation is carried out on how much could each term in the objective function of KEQA contribute. There are five terms in the objective function as shown in Eq. (9). In one or more embodiments, the performance of KEQA with respect to three groups of different combinations of terms is investigated. To study the contribution of every single term in Eq. (9), in the first group, i.e., Only_Keep, only one of the five terms is kept as the new objective function. To study the impact of missing one of the five terms, in the second group, i.e., Remove, one of the five terms is removed. To study the accumulated contributions, in the third group, i.e., Accumulate, terms area added as the new objective function one by one. The performance of KEQA with respect to different groups of objective functions on FB2M is summarized in Table 5.

TABLE 5

The performance of the KEQA embodiment with different objective functions on FB2M

|  | Only_Keep | Remove | Accumulate |
| --- | --- | --- | --- |
| $\|\mathbf{P}_\ell - \hat{\mathbf{P}}_\ell\|_2$ | 0.728 | 0.701 | 0.728 |
| $\|\mathbf{P}_h - \hat{e}_h\|_2$ | 0.195 | 0.751 | 0.745 |
| $\|f(e_h, \mathbf{P}_\ell) - \hat{e}_t\|_2$ | 0.730 | 0.753 | 0.745 |
| $sim[n(h), HED_{entity}]$ | 0.173 | 0.754 | 0.746 |
| $sim[n(\ell), HED_{non}]$ | 0.435 | 0.746 | 0.754 |

From the results in Table 5, three major observations are noted. First, the predicted predicate representation $\mathbf{P}_\ell$ has the most significant contribution in the presented framework. The first term achieves an accuracy of 0.728 independently. It is because the number of predicates 1,837 is much smaller than the number of training questions 75,910. Second, the predicted head entity representation $\hat{e}_h$ could complement $\mathbf{P}_\ell$ in the joint learning. The accuracy increases from 0.728 to 0.745 when $\hat{e}_h$ is used. The second term achieves a low accuracy independently since the total number of entities N is too large, e.g., N=1,963,115 in FB2M. Third, the predicate name $n(\ell)$ improves the performance of the KEQA by 1.1%. It could be explained by the fact that some utterances share a few words with the corresponding predicate names.

F. Some Conclusions

Question answering over knowledge graph is a crucial problem since it enables regular users to easily access the valuable but complex information in the large knowledge graphs via natural language. It is also a challenging problem since a predicate could have different natural language expressions. It is hard for a machine to capture their semantic information. In addition, even assuming that the entity name of a question is correctly identified, the ambiguity of entity names and partial names would still make the number of candidate entities large.

To bridge the gap, embodiments of a novel knowledge graph embedding based question answering problem are disclosed herein and embodiments of a simple and effective KEQA framework are presented. The KEQA framework targets solving simple questions, i.e., the most common type of question in QA-KG. Instead of inferring the head entity and predicate directly, KEQA jointly recovers the question's head entity, predicate, and tail entity representations in the KG embedding spaces. In one or more embodiments, attention-based bidirectional LSTM models are employed to perform the predicate and head entity representation learning. Since it is expensive and noisy to comparing with all entities in a KG, a head entity detection model is used to select successive tokens in a question as the name of the head entity, such that candidate head entity set would be reduced to a number of entities with the same or similar names. Given the predicted fact $\hat{e}_h$, $\hat{p}_r$, $\hat{e}_t$, embodiments of a carefully-designed joint distance metric are used to measure its distances to all candidate facts. The fact with the minimum distance is returned as the answer. Comprehensive experiments were conducted to evaluate the performance of the presented KEQA framework embodiments. Experiments on a large benchmark demonstrate that KEQA embodiments achieve better performance than state-of-the-art methods.

In one or more embodiments, the KEQA framework embodiments may be extended in various scenarios. The extension includes but not limits to (i) KEQA embodiments performing the question answering based on the pre-trained KG embedding. KEQA may be advanced by jointly conducting the KG embedding and question answering. (ii) Real-world knowledge graphs and training questions are often updated dynamically. KEQA framework embodiments may be extended to handle such a scenario.

G. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 8:
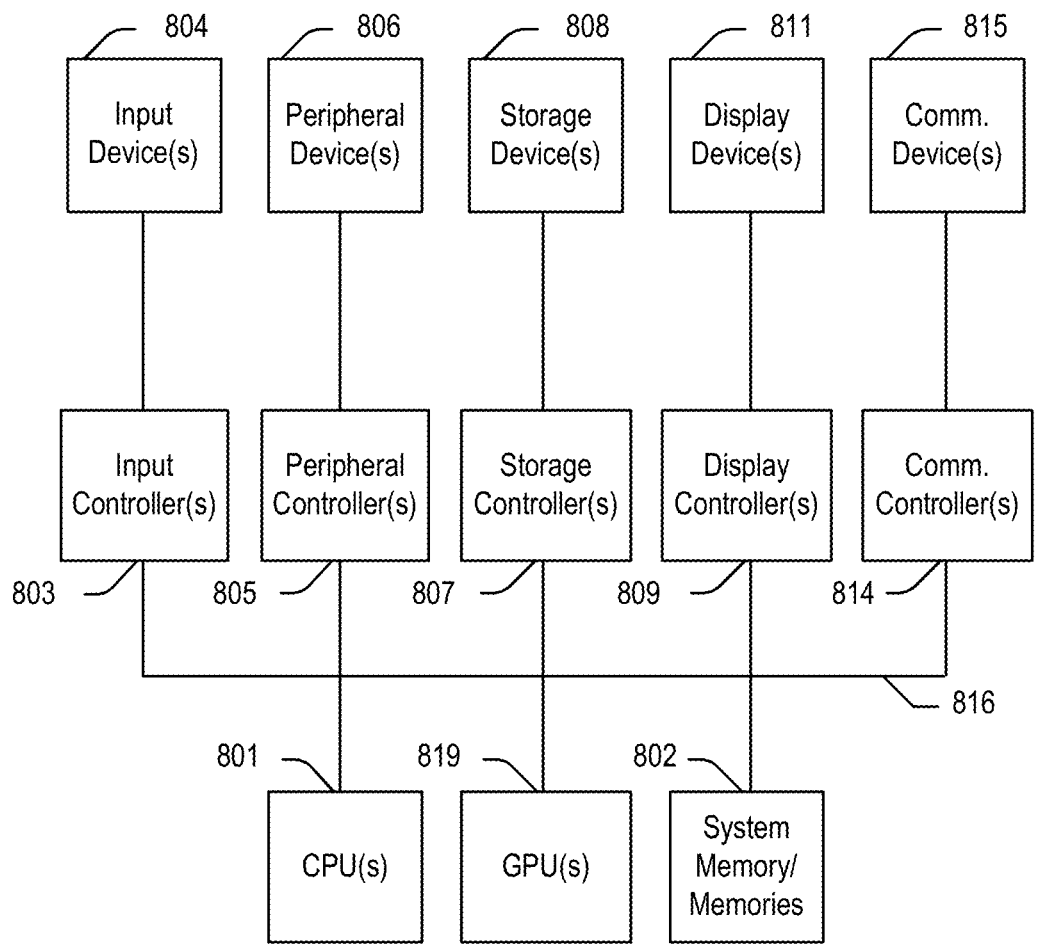
FIG. 8 depicts a simplified block diagram of a computing device/information handling system, in accordance with embodiments of the present document.

FIG. 8 depicts a simplified block diagram of a computing device/information handling system (or computing system) according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more central processing units (CPU) 801 that provides computing resources and controls the computer. CPU 801 may be implemented with a microprocessor or the like, and may also include one or more graphics processing units (GPU) 819 and/or a floating-point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, touchscreen, and/or stylus. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present invention. Storage device(s) 808 may also be used to store processed data or data to be processed in accordance with the invention. The system 800 may also include a display controller 809 for providing an interface to a display device 811, which may be a cathode ray tube (CRT), a thin film transistor (TFT) display, organic light-emitting diode, electroluminescent panel, plasma panel, or other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for question answering using one or more processors to cause steps to be performed comprising:

generating, using a predicate learning model and information of a knowledge graph (KG), a predicted predicate representation in a KG predicate embedding space for a question comprising one or more tokens;

generating, using a head entity learning model and information of the KG, a predicted head entity representation in a KG entity embedding space for the question;

obtaining a predicted tail entity representation, based on a relation function that relates, for a fact in KG embedding space, a head entity representation and a predicate representation to a tail entity representation, from the predicted predicate representation and the predicted head entity representation, wherein the predicted predicate representation, the predicted head entity representation, and the predicted tail entity representation forming a predicted fact;

identifying, using a head entity detection (HED) model, one or more predicted head entity names for the question, each predicted head entity name comprises one or more tokens from the question;

searching, in the KG, head entity synonyms related to the one or more predicted head entity names;

constructing a candidate fact set comprising one or more candidate facts, each candidate fact comprises a head entity among the head entity synonyms, a predicate, and a tail entity; and choosing, based on a joint distance metric, one candidate fact in the candidate fact set with a minimum joint distance to the predicted fact as an answer to the question, the joint distance metric comprises:

a first distance term related to a distance between the predicted head entity representation and a head entity embedding representation for the head entity in each candidate fact;

a second distance term related to a distance between the predicted predicate representation and a predicate embedding representation for the predicate in each candidate fact; and a third distance term related to a distance between the predicted tail entity representation and a tail entity embedding representation for the tail entity in each candidate fact.

2. The computer-implemented method of claim 1 wherein the predicate learning model has a neural network structure comprising a bidirectional recurrent neural network layer and an attention layer, and wherein the step of generating the predicted predicate representation comprises:

mapping the one or more tokens in the question into a sequence of word embedding vectors;

generating, using the bidirectional recurrent neural network layer, a forward hidden state sequence and a backward hidden state sequence;

concatenating the forward and backward hidden state vectors into a concatenated hidden state vector;

applying, by the attention layer, an attention weight to the concatenated hidden state vector to obtain a weighted hidden state vector;

concatenating the weighted hidden state vector with the word embedding to obtain a hidden state for each token;

applying a fully connected layer to the hidden state to obtain a target vector for each token; and using a mean of all target vectors as the predicted predicate representation.

3. The computer-implemented method of claim 2 wherein the head entity learning model has a neural network structure the same as the predicate learning model.

4. The computer-implemented method of claim 3 wherein the predicate learning model and the head entity learning model are pre-trained using a training data set with ground truth facts via a predicate objective function and a head entity objective function, respectively.

5. The computer-implemented method of claim 1 wherein the HED model has a neural network structure comprising a bidirectional recurrent neural network layer and a fully connecter layer, and wherein the step of identifying the one or more predicted head entity names for the question comprises:

mapping the one or more tokens in the question into a sequence of word embedding vectors;

generating, at the bidirectional recurrent neural network layer, a forward hidden state sequence and a backward hidden state sequence;

concatenating the forward and backward hidden state vectors to obtain a concatenated hidden state vector;

applying the fully connected layer and a Softmax function to the concatenated hidden state vector to obtain a target vector for each token, each target vector has two probability values corresponding to probabilities that the token belongs to entity token name and non-entity token name; and selecting one or more tokens as the head entity name based on probability value of each token belonging to entity token name.

6. The computer-implemented method of claim 1 wherein each of the first, second, and third distance terms uses a $\ell^2$ norm to measure distance.

7. The computer-implemented method of claim 6 wherein the joint distance metric further comprises string similarity terms representing a string similarity between name of entity in each candidate fact and the tokens classified as entity name by the HED model, and a string similarity between a name of the predicate in each candidate fact and the tokens classified as non-entity name by the HED model.

8. The computer-implemented method of claim 7 wherein the joint distance metric is a weighted combination of the distance terms and the string similarity terms.

9. The computer-implemented method of claim 6 wherein in each candidate fact, the tail entity embedding representation is calculated, using a relation function, from the head entity embedding representation and the predicate embedding representation.

10. The computer-implemented method of claim 1 wherein searching head entity synonyms in the KG related to the one or more predicted head entity names comprises:

inputting each predicated head entity name into the KG; and searching, in the KG, head entity synonyms for each predicated head entity name, by both embedding comparison and string match, wherein each head entity synonym has a direct or partial string match to the predicated head entity name or has embedding similarity to the predicated head entity name.

11. The computer-implemented method of claim 10 wherein for a predicated head entity name comprising multiple tokens, an entity representation for the predicated head entity name is formed from a dot product of entity representations of each token.

12. A computer-implemented method for question answering using one or more processors that cause steps to be performed comprising:

generating, using a predicate learning model stored in one or more memories of one or more computing devices and information of a knowledge graph (KG), a predicted predicate representation for a question comprising one or more tokens in a predicate embedding space, the predicate learning model being pre-trained using training data with ground truth facts and a predicate objective function;

generating, using a head entity learning model stored in one or more memories of one or more computing devices and information of the KG, a predicted head entity representation for the question in an entity embedding space, head entity learning model being pre-trained using training data with ground truth facts and a head entity objective function;

identifying, using a relation function based upon KG embedding, a predicted tail entity representation from the predicted predicate representation and the predicted head entity representation, wherein the predicted head entity representation, the predicted predicate representation, and the predicted tail entity representation forming a predicted fact; and selecting a candidate fact among at least a subset of facts comprising one or more candidate facts chosen from one or more facts in the KG, based on a joint distance metric, as answer to the question, wherein the selected candidate fact has a minimum joint distance between it and the predicted fact according to the joint distance metric, and wherein each candidate fact comprises a head entity, a predicate, and a tail entity, and wherein the joint distance metric comprises:

a first distance term related to a distance between the predicted head entity representation and a head entity embedding representation for the head entity in each candidate fact;

a second distance term related to a distance between the predicted predicate representation and a predicate embedding representation for the predicate in each candidate fact; and a third distance term related to a distance between the predicted tail entity representation and a tail entity embedding representation for the tail entity in each candidate fact.

13. The computer-implemented method of claim 12 wherein the head entity embedding representation in each candidate fact is for a head entity as a synonym for one or more predicted head entity names identified by a head entity detection (HED) model comprising at least a bidirectional recurrent neural network layer and a fully connected layer.

14. The computer-implemented method of claim 13 wherein the one or more predicted head entity names are identified by the HED model by steps comprising:

generating, using the bidirectional recurrent neural network layer, a forward hidden state sequence and a backward hidden state sequence from a sequence of word embedding vectors of the one or more tokens in the question;

concatenating the forward and backward hidden state vectors into a concatenated hidden state vector;

applying at least the fully connected layer to the concatenated hidden state vector to obtain a target vector for each token, each target vector has two probability values corresponding to probabilities that the token belongs to entity token name and non-entity token name; and selecting one or more tokens as the head entity name based on probability value of each token belonging to entity token name.

15. The computer-implemented method of claim 13 wherein each of the first, second and third distance terms represents a $\ell^2$ norm of a corresponding distance the joint distance metric further comprises one or more string similarity terms representing:
- a string similarity between name of entity in each candidate fact and the tokens classified as entity name by the HED model, and
- a string similarity between name of the predicate in each candidate fact and the tokens classified as non-entity name by the HED model.

16. The computer-implemented method of claim 15 wherein the joint distance metric is a weighted combination of the first distance term, the second distance term, the third distance term, and the string similarity terms with a weight for each term in the joint distance metric.

17. A non-transitory computer-readable medium or media comprising one or more sequences of instructions which, when executed by one or more processors, causes the steps for question answering to be performed comprising:
- generating, using information of a knowledge graph (KG), a vector in a KG predicate embedding space as a predicted predicate representation for a question comprising one or more tokens;
- generating, using information of the KG, a vector in a KG entity embedding space as a predicted head entity representation for the question;
- obtaining a predicted tail entity representation, based on a relation function based upon knowledge graph (KG) embedding, from the predicted predicate representation and the predicted head entity representation, wherein the predicted predicate representation, and the predicted tail entity representation forming a predicted fact;
- identifying one or more predicted head entity names for the question, each predicted head entity name comprises one or more tokens from the question;
- searching, in the KG, head entity synonyms to the one or more predicted head entity names by both embedding comparison and string match;
- constructing a candidate fact set comprising one or more candidate facts, each candidate fact comprises a head entity among the head entity synonyms, a predicate, and a tail entity; and
- choosing one candidate fact in the candidate fact set with a minimum joint distance to the predicted fact based on a joint distance metric as an answer to the question, the joint distance metric comprises:
  - a first distance term related to a distance between the predicted head entity representation and a head entity embedding representation for the head entity in each candidate fact;
  - a second distance term related to a distance between the predicted predicate representation and a predicate embedding representation for the predicate in each candidate fact; and
  - a third distance term related to a distance between the predicted tail entity representation and a tail entity embedding representation for the tail entity in each candidate fact.

18. The non-transitory computer-readable medium or media of claim 17 wherein each of the first, second, and third distance terms represents a $\ell^2$ norm of a corresponding distance, the joint distance metric further comprises one or more string similarity terms representing:
- a string similarity between an entity name of each candidate fact and entity tokens in the question, and
- a string similarity between a predicate name of each candidate fact and non-entity tokens in the question.

19. The non-transitory computer-readable medium or media of claim 18 wherein the joint distance metric is a weighted combination of the first, second, and third distance terms and the string similarity terms.

20. The non-transitory computer-readable medium or media of claim 19 wherein in the joint distance metric, the string similarity terms counterweight the distance terms.

* * * * *